United States Patent [19]

Okeya et al.

[11] Patent Number: 5,545,983

[45] Date of Patent: Aug. 13, 1996

[54] DISPLACEMENT SENSOR WITH TEMPERATURE COMPENSATION BY COMBINING OUTPUTS IN A PREDETERMINED RATIO

[75] Inventors: Makoto Okeya; Yasunori Ueki; Norio Ito, all of Suwa, Japan

[73] Assignee: Seiko Epson Corporation, Tokyo, Japan

[21] Appl. No.: 295,749

[22] PCT Filed: Mar. 2, 1993

[86] PCT No.: PCT/JP93/00262

§ 371 Date: Sep. 16, 1994

§ 102(e) Date: Sep. 16, 1994

[87] PCT Pub. No.: WO93/18369

PCT Pub. Date: Sep. 16, 1993

[30] Foreign Application Priority Data

Mar. 2, 1992 [JP] Japan ................... 4-044481
May 12, 1992 [JP] Japan ................... 4-119102
Nov. 27, 1992 [JP] Japan ................... 4-318568

[51] Int. Cl.$^6$ .............. G01B 7/04; G01B 7/30; H03K 3/38

[52] U.S. Cl. .............. 324/207.12; 324/207.2; 327/513

[58] Field of Search ............. 324/207.12, 207.15, 324/207.2, 207.21, 207.23–207.26, 225, 227, 235, 251, 252, 260–262; 338/32 R, 32 H; 307/309; 327/513

[56] References Cited

U.S. PATENT DOCUMENTS 3,634,799  1/1972  Strauch .................. 324/207.12 X
4,893,027  1/1990  Kammerer et al. ........ 324/207.12 X
4,970,463  11/1990 Wolf et al. ............. 324/207.2
5,128,613  7/1992  Takehashi ............... 324/225 X
5,402,064  3/1995  Eck et al. .............. 324/207.12 X

FOREIGN PATENT DOCUMENTS 56-109003  8/1981  Japan.
58-122403  7/1983  Japan.

Primary Examiner—Sandra L. O'Shea
Assistant Examiner—Roger Phillips
Attorney, Agent, or Firm—Kanesaka & Takeuchi

[57] ABSTRACT

A displacement sensor provided with a magnet (4) and magnetoelectric conversion element for sensing the variation of magnetism caused by the magnet to sense the displacement of the magnetic material to be measured, which includes a first magnetoelectric conversion element (5) located in the place where the magnetic flux density is varied by the displacement of the material to be measured (7), a second magnetoelectric conversion element (6) of the same kind as the first magnetoelectric conversion element (5) located in the place where the magnetic flux density is not varied by the displacement of the material to be measured, and a circuit element (10) for adding the outputs of the first and second magnetoelectric conversion element at a predetermined ratio of V20/V10, wherein V20 and V10 are outputs from the first and second magnetoelectric conversion elements, respectively, for a displacement of 0 at a temperature of 20° C.

13 Claims, 12 Drawing Sheets

| displacement temperature | 0 mm | 10 mm | 20 mm |
|---|---|---|---|
| 20 °C | 0.000 V | 0.109 V | 0.218 V |
| −30 °C | −0.300 V | −0.179 V | −0.058 V |

FIG.21

| displacement temperature | 0 mm | 10 mm | 20 mm |
|---|---|---|---|
| 20 °C | 0.000 V | 0.109 V | 0.218 V |
| −30 °C | 0.000 V | 0.121 V | 0.242 V |

FIG.22

| displacement temperature | 0 mm | 10 mm | 20 mm |
|---|---|---|---|
| 20 °C | 0.000 V | 0.109 V | 0.218 V |
| −30 °C | 0.000 V | 0.108 V | 0.216 V |

FIG.23

| $V_1 \backslash V_3$ | −0.20 | −0.24 | −0.28 | −0.32 |
|---|---|---|---|---|
| −0.20 | −0.20 | −1.21 | −2.20 | −3.21 |
| −0.24 | +0.75 | −0.24 | −1.25 | −2.26 |
| −0.28 | +1.72 | +0.72 | −0.28 | −1.28 |
| −0.32 | +2.68 | +1.69 | +0.68 | −0.33 |

FIG.24

| displacement temperature | 0 mm | 1 0 mm | 2 0 mm |
|---|---|---|---|
| 2 0 ℃ | 0.000 V | 0.109 V | 0.218 V |
| − 3 0 ℃ | −0.014 V | 0.111 V | 0.236 V |

FIG.25

[driving method and temperature coefficient(%/℃)]

| Hall element \ driving method | constant voltage drive | constant current drive |
|---|---|---|
| G a A s | − 0. 3 | − 0. 0 6 |
| I n S b | − 0. 2 | − 2 |

FIG.26

| displacement temperature | 0 mm | 1 0 mm | 2 0 mm |
|---|---|---|---|
| 2 0 ℃ | 0.000 V | 0.109 V | 0.218 V |
| − 3 0 ℃ | 0.000 V | 0.109 V | 0.218 V |

DISPLACEMENT SENSOR WITH TEMPERATURE COMPENSATION BY COMBINING OUTPUTS IN A PREDETERMINED RATIO

FIELD OF THE INVENTION

The present invention relates to a displacement sensor which comprises a magnet and magnetoelectric conversion means for sensing the variation of magnetism caused by the magnet, and senses the displacement of a magnetic material to be measured, such as iron.

BACKGROUND OF THE INVENTION

Sensing the location of a magnetic material or magnet by using magnetoelectric conversion elements such as Hall elements or magnetic resistance elements has been a widely practiced method, for example, in sensing the phase of a DC brushless motor. However, even a GaAs Hall element, which usually has a small temperature coefficient, has a temperature coefficient of $-0.06\%/°C$. during constant-current drive. Therefore, the displacement could not be accurately sensed in a wide temperature range.

In order to overcome this problem:

1) Japanese Patent No. 1094798 (Japanese Laid-Open Patent Application No. 38073/1981) provides a compound magnetoelectric conversion means which is composed of Hall elements and a temperature sensing element all closely placed on a base material in the same pattern, and which is thereby capable of performing excellent temperature compensation even for local temperature variations in the element itself.

2) In Japanese Laid-Open Patent Application No. 171879/1983, the variations of output voltage caused by the temperature variations of the Hall elements are controlled by forming compensation resistors in series on a base member.

3) Japanese Laid-Open Patent Application No. 248010/1989 is aimed at obtaining a high precision throttle sensor that is independent of temperature variations, with the polarities of the temperature coefficients of the magnet and the Hall elements opposite to each other.

Although the compound magnetoelectric conversion elements described in 1) and 2) are excellent in temperature compensation, the production of these compound magnetoelectric conversion elements is difficult and costly.

Furthermore, these compound magnetoelectric conversion elements are not generally used, and therefore hard to come by.

In a displacement sensor comprising a permanent magnet and megnetoelectric conversion elements as described in 1) and 2), the surface magnetic flux density of the permanent magnet itself has temperature characteristics, and therefore, compensation only for the temperature characteristics of the magnetoelectric conversion elements is not enough to compensate for the temperature characteristics of the whole displacement sensor.

In the case of 3), the problem is the difficulty in adjusting the temperature coefficients of the magnet and the Hall elements so that they are opposed to each other. Though Si Hall ICs are used in place of Hall elements to provide a switching sensor, the electron mobility of Si is so small that the swicthing sensor is not suitable for a high precision sensor. Further, Si Hall ICs have a large offset voltage, which causes variations in temperature characteristics.

Thus, the displacement sensor the prior art is not capable of performing accurate sensing due to temperature variations and is not suitable for the use in a wide temperature range.

Accordingly, the present invention is basically aimed at providing a displacement sensor that is capable of accurately sensing the displacement in a wide temperature range by compensating for the temperature coefficients of a permanent magnet and magnetoelectric conversion elements. Even when the displacement sensor is used in a place where the temperature varies greatly, the displacement is sensed with high precision by the displacement sensor.

SUMMARY OF THE INVENTION

A displacement sensor of the present invention comprises a magnet and magnetoelectric conversion means for sensing the variation of magnetism cuased by the magnet to sense the displacement of the magnetic material to be measured. In this displacement sensor, a first magnetoelectric conversion means is located in the place where the magnetic flux density is varied by the displacement of the magnetic material to be measured, while a second magnetoelectric conversion means of the same type as the first magnetoelectric conversion means is located in the place where the magnetic flux density is not varied. A circuit means for adding the outputs of the first and second magnetoelectric conversion means at a predetermined ratio is also provided in the displacement sensor. This structure is aimed at minimizing the temperature coefficient of the displacement sensor in a wide temperature range, wherein the temperature compensation is performed for the first magnetoelectric conversion means by adding at a predetermined ratio the output of the first magnetoelectric conversion means located in the place where the magnetic flux density is varied by the displacement of the material to be measured and the output of the second magnetoelectric conversion means located in the place where the magnetic flux density is not varied.

A displacement sensor of another structure also comprises a magnet and magnetoelectric conversion means for sensing the variation of magnetism cuased by the magnet to sense the displacement of the magnetic material to be measured. Provided in this displacement sensor are a first magnetoelectric conversion means located in the place where the magnetic flux density is varied by the displacement of the magnetic material to be measured, a second magnetoelectric conversion means of the same type as the first magnetoelectric conversion means located in the place where the magnetic flux density is not varied by the displacement of the magnetic material to be measured, a circuit means having a temperature coefficient of the opposite polarity to that of the magnet and the magnetoelectric conversion means, and a circuit means for adding the outputs of the first and second magnetoelectric conversion means at a predetermined ratio. This structure of the displacement sensor is aimed at further minimizing the temperature coefficient of the displacement sensor, wherein temperature compensation is performed by adjusting the temperature coefficient of the above circuit means so that it becomes opposite to that of the magnet and the magnetoelectric conversion means.

A displacement sensor of yet another structure also comprises a magnet and magnetoelectric conversion means for sensing the variation of magnetism cuased by the magnet to sense the displacement of the magnetic material to be measured. Provided in this displacement sensor are a first magnetoelectric conversion means located in the place where the magnetic flux density is varied by the displacement of the magnetic material to be measured, a second magnetoelectric conversion means located in the place where the magnetic flux density is not varied by the displacement of the magnetic material to be measured, and for adding the outputs of the two magnetoelectric conversion means at a predetermined ratio. The temperature coefficient of the first magnetoelectric conversion means is adjusted so as to differ from that of the second magnetoelectric conversion means. The first and second magnetoelectric conversion means are composed of elements each having a temperature coefficient that is varied depending on the magnetic flux density. Temperature compensation is performed by combining driving methods for the first and second magnetoelectric conversion means, thereby further minimizing the temperature coefficient of the displacement sensor.

A displacement sensor of still another structure comprises a magnet and magnetoelectric conversion means for sensing the variation of magnetism cuased by the magnet to sense the displacement of the magnetic material to be measured. Provided in this displacement sensor are a first magnetoelectric conversion means located in the place where the magnetic flux density is varied by the displacement of the magnetic material to be measured, a second magnetoelectric conversion means of the same type as the first magnetoelectric conversion means located in the place where the magnetic flux density is not varied by the displacement of the magnetic material to be measured, and a circuit means for adding the outputs of the two magnetoelectric conversion means at a predetermined ratio to sense the displacement of the material to be measured, all of which are contained in a case. The case has a heat insulating structure so that the temperature in the case is kept constant independently of the temperature of the external environment. Optionally, by using a case of a material having a high thermal conductivity, the displacement sensor can respond rapidly to the temperature of the external environment.

BRIEF DESCRIPTION OF THE DRAWINGS

FIGS. 2A and 2B are diagrammatic views of the principle of sensing the displacement of the material to be measured.

DETAILED DESCRIPTION OF PREFERRED EMBODIMENTS

The first example of the present invention will be described in reference to the drawings. The displacement sensor of this example consists of a sensing element and a circuit element.

Figure 1:
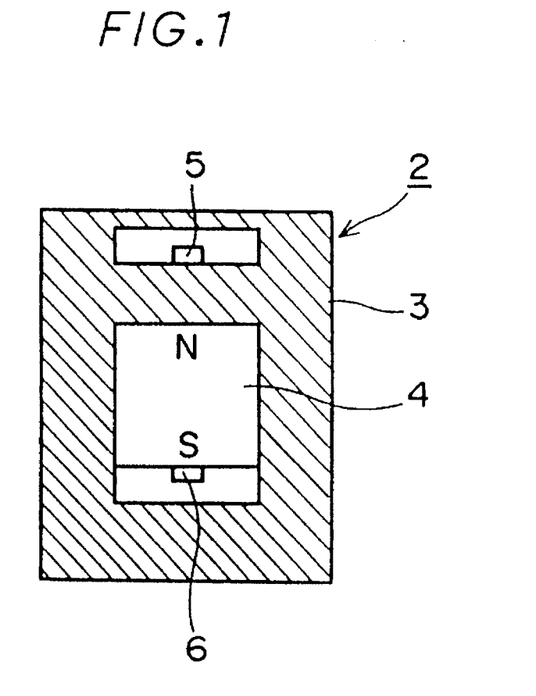
FIG. 1 is a longitudinal sectional view of the sensing element of the displacement sensor in the first example of the present invention.

FIG. 1 shoes a sectional view of the sensing element 2 of the displacement sensor 1 of this example. The sensing element 2 consists of a permanent magnet 4, a first Hall element (first magnetoelectric conversion means) 5 placed at a predetermined distance from the N-pole of the permanent magnet 4, and a second Hall element (second magnetoelectric conversion means) 6 in contact with the S-pole of the permanent magnet 4, all contained in a case 3 that is made of a non-magnetic material. The magnetic poles of the permanent magnet 4 can be reversed.

Figure 2A:
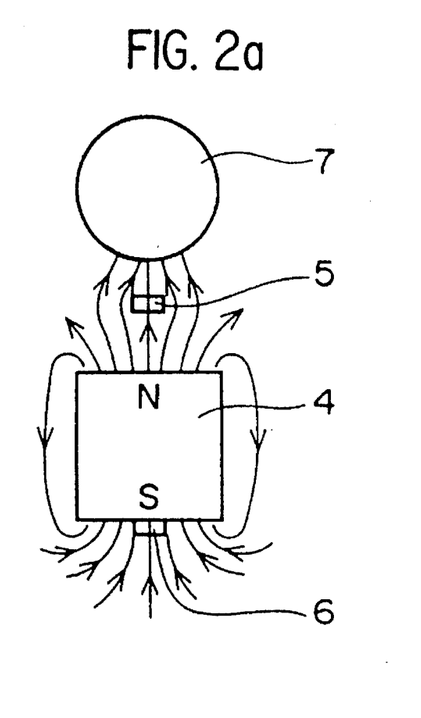
Figure 3A:
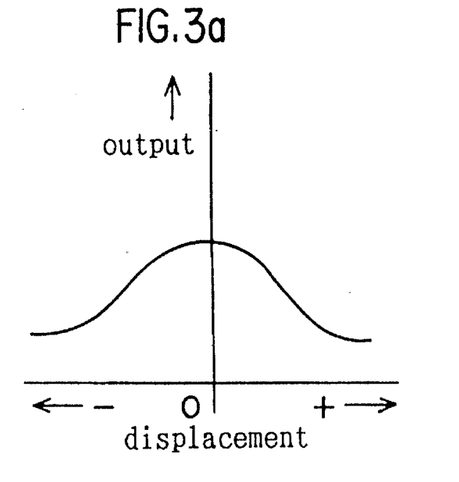
FIGS. 3A and 3B are graphical views of the output characteristics of the magnetoelectric conversion means in relation to the displacement of the material to be measured.
Figure 3B:
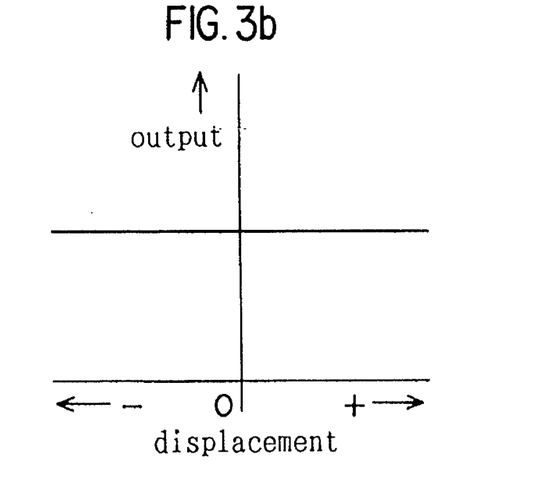

FIGS. 2 and 3 illustrate the principle upon which the displacement is sensed according to eh variations in magnetic flux distribution caused by the displacement of the material to be measured. In FIGS. 2(a) and 2(b), the permanent magnet 4, the first Hall element 5, and the second Hall element 6 are identical to that of FIG. 1. The non-magnetic case 3 is not shown in FIG. 2. The magnetic material to be measured is a steel wire 7. In this example, the displacement of the material to be measured occurs in a lateral direction while maintaining a certain distance vertically from the Hall elements 5 and 6. The displacement sensing can be performed as well in the case where the displacement occurs in a longitudinal direction.

FIG. 2(a) illustrates the case where the wire is situated on the center line of the Hall elements 5 and 6, which position is taken as the displacement 0. The lines of magnetic force in the drawing show the magnetic flux flowing from the N-pole toward the S-pole while part of it passes through the wire 7. Since every magnetic material has a magnetic permeability higher than that of air, the magnetic flux is attracted to the wire 7. FIG. 2(b) illustrates with lines of magnetic force the magnetic flux when the displacement of the wire occurs in a lateral direction. The magnetic flux is varied as it is attracted to the wire 7 that is made of a magnetic material, and the magnetic flux density at the first Hall element 5 is smaller than that at the displacement 0.

When the driving current is constant, the output of the first Hall element 5 is given by the expression:

$$E = K \cdot B$$

where E is the output voltage (unit: volt, or V); K is the constant of the Hall element determined by the temperature of the external environment, and the driving current; and B is the magnetic flux density (unit: gauss, or G).

Accordingly, the relationship between the displacement of the wire 7 and the output of the Hall element 5 at a constant temperature is as shown graphically in FIG. 3(a). As the magnetic flux density is reduced by the displacement of the wire 7, the output of the first Hall element 5 is reduced.

Meanwhile, as can be seen from FIGS. 2(a) and 2(b), the magnetic flux density at the second Hall element 6 is not varied by the displacement of the wire 7, and therefore, the output of the second Hall element 6 at a constant temperature is constant as shown graphically in FIG. 3(b).

In an experiment using a PrFeB magnet that is 30 mm×30 mm in cross-sectional area and has a surface magnetic flux density of 3700 G, and a wire having a diameter of 40 mm, the distance between the permanent magnet 4 and the first Hall element 5 is 17 mm while the distance between the first Hall element 5 and the wire 7 is 12 mm, and the temperature is 20° C. Under such conditions the magnetic flux density at the first Hall element 5 is 1000 G when the displacement of the wire is 0 mm, 960 G when the displacement of the wire is 10 mm, and 920 G when the displacement of the wire is 20 mm. Thus, in the present invention, the displacement ranging from 0 to 20 mm can be sensed in the range of 1000 to 920 G.

Figure 4:
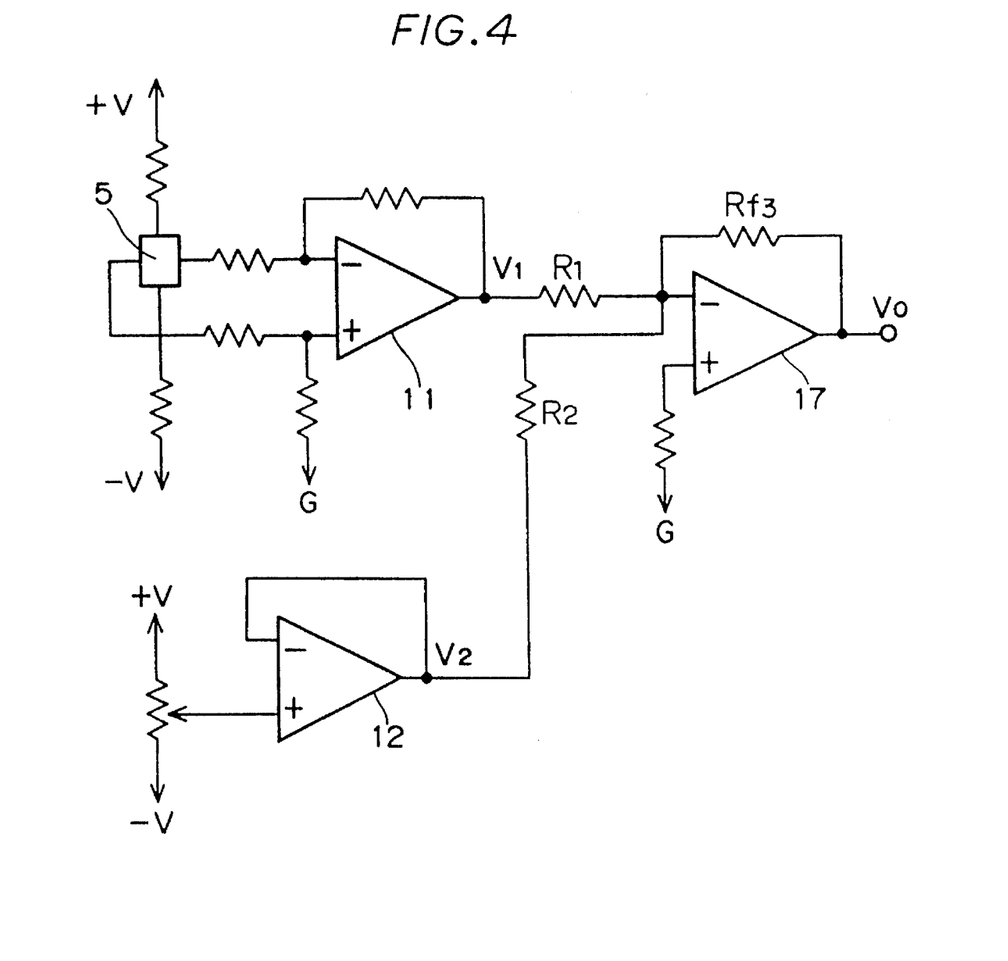
FIG. 4 is a circuit diagrams of an example of the bias cancelling circuit.
Figure 5:
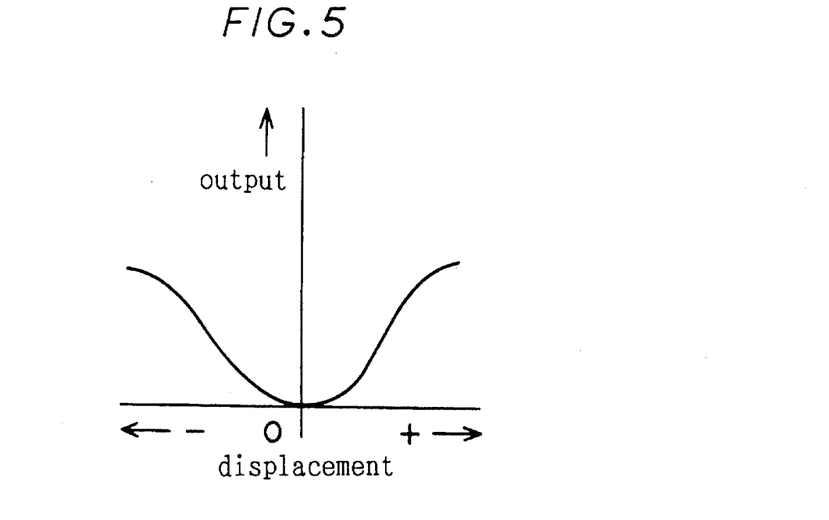
FIG. 5 is a graphical representation of the characteristics of the output adjustment by the bias cancelling circuit.

In order to measure the displacement of the wire sensitively and accurately, it is necessary to amplify the output of the first Hall element 5 to compensate for the difference caused by the displacement, which is equivalent to the margin of 40 G in the above experiment. In FIG. 4, for example, a bias voltage is generated, and then subtracted from the amplified output of the first Hall element 5. Reference numeral 11 indicates an amplifier for amplifying the output of the first Hall element 5, reference numeral 12 a bias generating circuit for generating DC bias voltage depending on the sensitivity of the bias magnetic field and the first Hall element, and reference numeral 17 a bias cancelling circuit for cancelling bias voltage by adding the outputs of the amplifier 11 and the bias generating circuit 12. The output Vo at a constant temperature is as shown in FIG. 5, where R1=R2=Rf3.

However, the temperature coefficient of the Hall constant of GaAs Hall elements during constant-current drive is −0.06%/°C., while the temperature coefficient of the magnetic flux density of the PrFeB magnet used in this experiment is about −0.11%/°C. The total temperature coefficient of the circuit in this experiment is −0.22%/°C. The following is a case where temperature T1 is 20° C., temperature T2 is −30° C. and the temperature difference between T1 and T2 is 50° C. In the circuit shown in FIG. 4, the output of the amplifier 11 is 2.73 V when the temperature is $T_1$ and the displacement 0 mm. The output V1(V) of the amplifier 11 can be determined by the following formula:

$$V1 = 2.73 \times 10^{-3} \times B1 \times (1 - 2.2 \times 10^{-3} \times (T-20)) \times f(X)$$

where B1 is the magnetic flux density (G) at the first Hall element 5 at the temperature T1; T is the temperature (°C.); f(X) is a function of the displacement X (mm). The data compiled in the above experiment show: f(0)=1, f(10)=0.96, f(20)=0.92.

Figure 20:
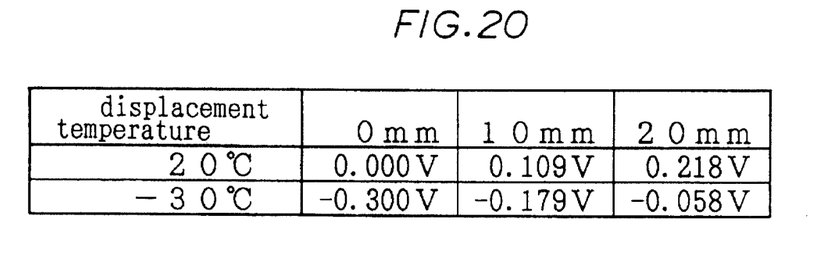
FIG. 20 is a table showing the circuit output V0 generated when the temperature is 20° C. or −30° C. and the displacement is 0 mm, 10 mm, or 20 mm.

FIG. 20 shows the output Vo in the case where the temperature is $T_1$ and the displacement is 0 mm in the bias generating circuit 12 of FIG. 4, and where the output of the bias cancelling circuit 13 is adjusted to 0 V while the displacement and temperature are subjected to variations. The temperature coefficient of the whole displacement sensor (with the wire displaced by 10 mm) is +5.28%/°C., and the temperature coefficient of the whole displacement sensor (with the wire displaced by 20 mm) is +2.53%/°C.

As can be seen from the FIG. 20, when only the first Hall element 5 is used, the output variation caused by the 50° C. variation in temperature is greater than the output variation caused by the 10 mm displacement, which means that the sensor is not accurate enough for a displacement sensor.

Figure 6:
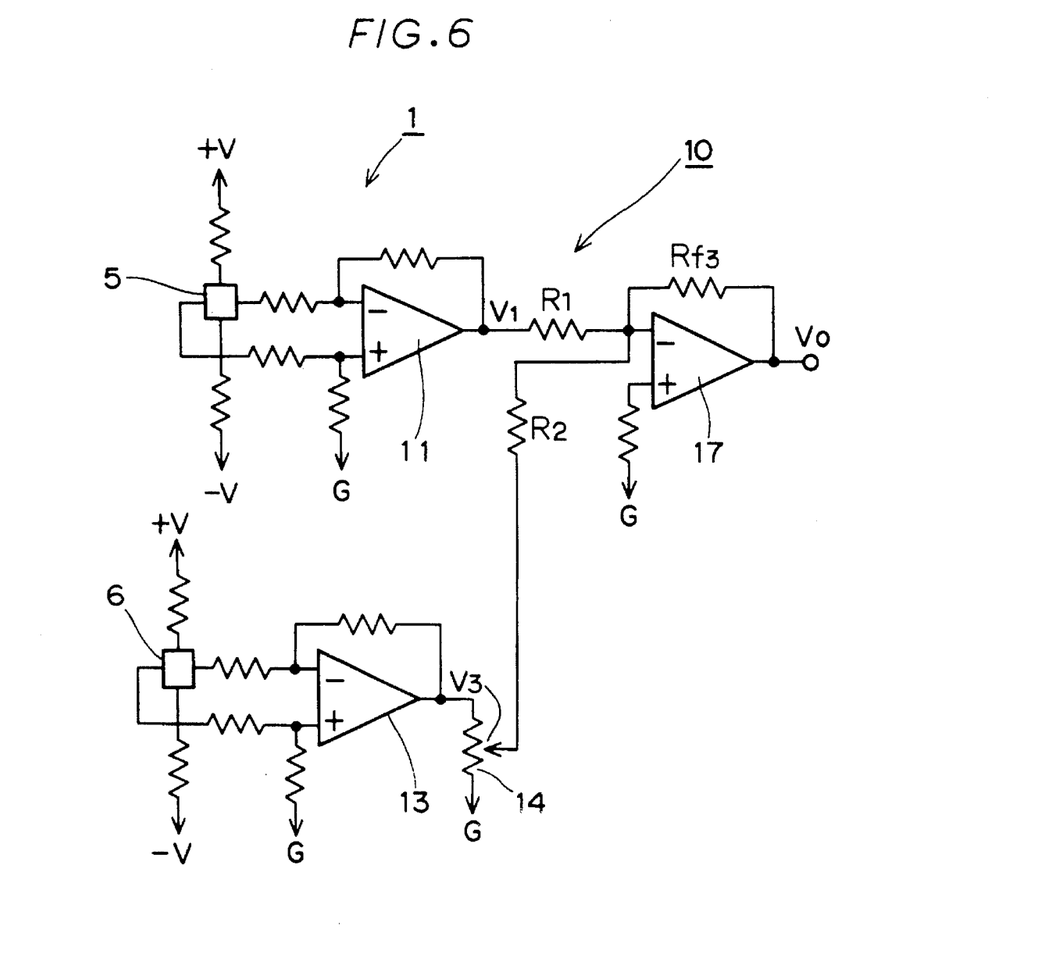
FIG. 6 is a circuit diagram of the circuit element of the displacement sensor.

In this example, the displacement sensor 1 comprises a circuit 10 shown in FIG. 6 in place of the circuit of FIG. 4. The amplifier 11 and the bias cancelling circuit 17 are identical to that of FIG. 4. Reference numeral 13 indicates an amplifier for amplifying the output of the second Hall element 6, and reference numeral 14 an attenuator for attenuaing the output of the amplifier 13 at a predetermined ratio. The magnetic flux density at the second Hall element 6 is not varied by the displacement of the wire 7. The permanent magnet 4, the first Hall element 5, and the second Hall element 6 are closely contained in the case 3 so that the temperature in the sensor is kept constant. In FIG. 6, the output of the amplifier 13 is adjusted by feedback resistors or the attenuator 14 so that the output V0 of the bias cancelling circuit is 0, with T1=20° C. and the displacement 0 mm. Thereby, when T1 is 20° C. and the displacement 0 mm, the output V3 is 2.73 V, which is equal to the output V1 of the amplifier 11. Accordingly, the output V3 of the amplifier 13 can be determined by the formula:

$$V3 = 2.73 \times 10^{-3} \times B2 \times (1 - 2.2 \times 10^{-3} \times (T-20))$$

Figure 21:
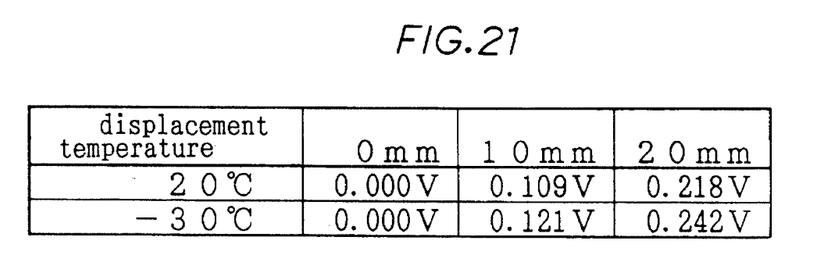
FIG. 21 is a table showing the circuit output V0 generated when the temperature is 20° C. or −30° C. and the displacement is 0 mm, 10, or 20 mm.

FIG. 21 shows the output Vo in the circuit of FIG. 6, with the temperature and displacement subjected to variations. The temperature coefficient of the whole displacement sensor becomes −0.22%/°C. and the sensing accuracy is dramatically increased, thereby enabling the displacement sensor to be put into practical use.

Figure 7:
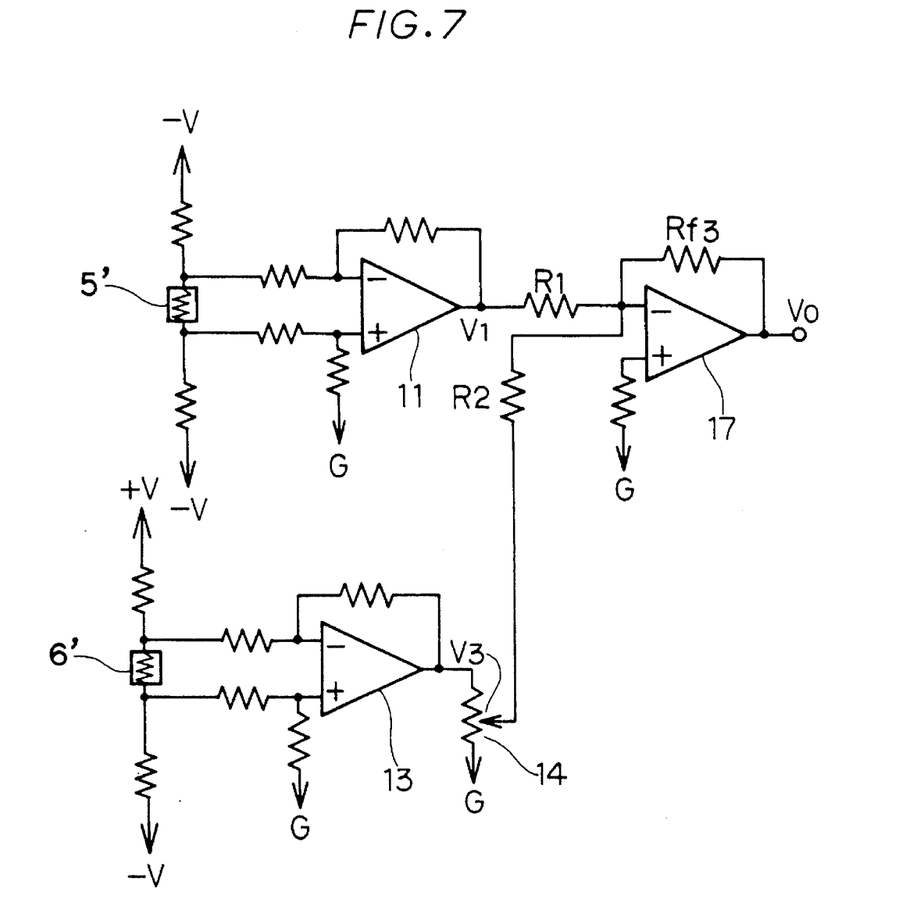
FIG. 7 is a circuit diagram of another embodiment of the circuit element of the displacement sensor.

Thus, the temperature characterstics of a displacement sensor comprising a permanent magnet and Hall elements can be dramatically improved in this example. Although Hall elements are used in this example, it should be understood that other magnetoelectric conversion elements, for example, magnetic resistance elements 5' and 6' can also be used as shown in FIG. 7.

The second example of the present invention will be described below.

Figure 8:
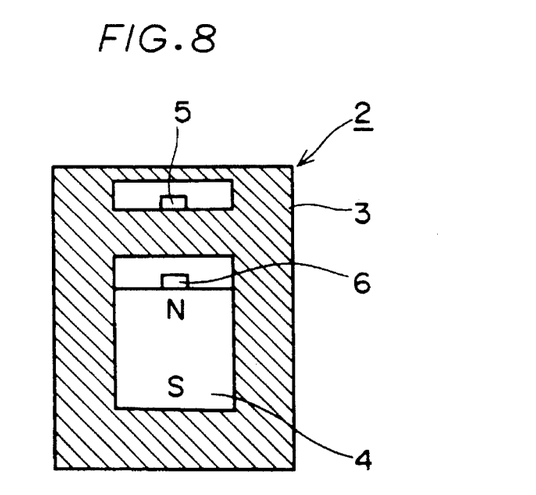
FIG. 8 is a longitudinal sentional view of another embodiment of the sensing element of the displacement sensor.

As shown in FIG. 8, the displacement sensor 1 of this example comprises a sensing element 2. Contained in a non-magnetic case 3 are a permanent magnet 4, a first Hall element 5 placed at a predetermined distance from the N-pole of the permanent magnet 4, and a second Hall element 6 in contact with the N-pole of the permanent magnet 4. The magnetic poles of the permanent magnet can be reversed.

Since the second Hall element 6 is in contact with the N-pole of the permanent magnet 4, the magnetic flux density is not varied by the displacement of the material to be measured, just as in the first example. Therefore, the displacement of the material to be measured 7, as in the first example, can be sensed by the circuit 10 shown in FIG. 6, regardless of variations in temperature. In this example, too, the magnetoelectric conversion elements may be magnetic resistance elements.

The third example of the present invention will be described in reference to the drawings. This example is aimed at further improving the accuracy of the displacement sensor of the first example.

The sensing element 2 of the displacement sensor 1 of this example is constituted in the same manner as in FIG. 1 showing the first example. The magnetic flux density at the first Hall element 5 is 1000 G when the displacement of the wire is 0 mm, 960 G when the displacement is 10 mm, and 920 G when the displacement is 20 mm. The temperature coefficient of the sensing element 2 is −0.22%/°C.

In the first example, as shown in FIG. 21, when the displacement is 10 mm, the output is varied 10% by the 50° C. temperature variation, which means that the sensor is not accurate enough for a displacement sensor that is required to be extremely accurate.

Figure 9:
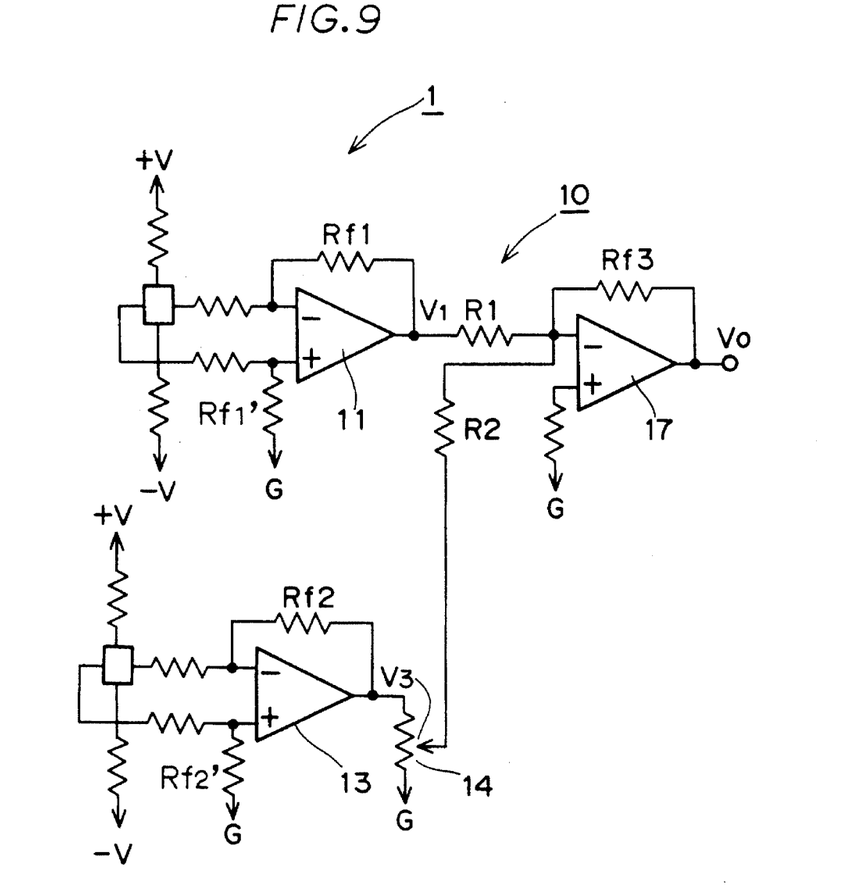
FIG. 9 is a circuit diagram of the circuit element of the displacement sensor in accordance with the third example of the present invention.

In this example, to further improve the accuracy of the whole displacement sensor 1, temperature sensing resistors having the opposite temperature coefficient to that of the permanent manget 4 and the first and second Hall elements 5 and 6 are employed as feedback resistors Rf1, Rf2, and Rf1', Rf2' in the circuit means 10 as shown in FIG. 9. Since the total temperature coefficient of the permanent magnet 4 and the Hall elements 5 and 6 is −0.22%/°C., the temperature resistors having a temperature coefficient of +0.22%/°C. and the same resistance is used as the feedback resistors Rf1, Rf2, and Rf1', Rf2' in the circuit of FIG. 9, where R1=R2= Rf3. In the circuit of this example, the output of the amplifier 11 is 2.73 V when the temperature T1 is 20° C. and the displacement is 10 mm. The output V1(V) of the amplifier 11 can be determined by the following formula:

$$V1 = 2.73 \times 10^{-3} \times B1 \times (1 - 2.2 \times 10^{-3} \times (T-20)) \times (1 + 2.2 \times 10^{-3} \times (T-20)) \times f(X)$$

In the circuit shown in FIG. 9, when the temperature is T1 and the displacement is 0 mm, the voltage V2 of the amplifier 13 which is adjusted by the attenuator 14 is 2.73 V, which is equal to the output V1 of the amplifier 11 for adjusting the output V0 of the bias canceling circuit 17 to 0 V. Since the magnetic flux density at the second Hall element 6 is not varied by the displacement of the wire 7, the output V3(V) can be determined by the formula:

$$V3 = -2.73 \times (1 - 2.22 \times 10^{-3} \times (T-20)) \times (1 + 2.2 \times 10^{-3} \times (T-20))$$

Figure 22:
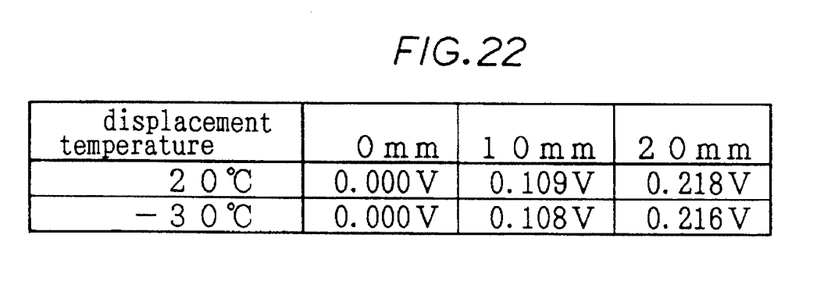
FIG. 22 is a table showing the circuit output V0 generated when the temperature is 20° C. or −30° C. and the displacement is 0 mm, 10, or 20 mm.

FIG. 22 shows the output V0 when the displacment and temperature are subjected to variations. The temperature coefficient of the whole displacment sensor is +0.02%/°C. (the displacement is 10 mm or 20 mm).

In this example, the output variation by the 50° C. temperature variation is not caused even when the displacement is 20 mm, thus enabling accurate sensing of the displacement.

Although this example has been described in its preferred form with the use of Hall elements, it should be understood that other magnetoelectric conversion means, such as magnetic resistance elements, can be used in place of the Hall elements. While the temperature sensing resistors are used in this example as the feedback resistors for the amplifier 11 and 13 to compensate for temperature variations, the temperature sensing resistors can also be used as resistors at the input stages of the amplifiers 11 and 13, or as feedback resistors for the amplifier 17, or as partial pressure resistors at the input stages of R1, R2 and the Hall elements, without detracting the expected effects. Further, the polarities of the permanent magnet 4 can be reversed even if the first Hall element 5 is located at a predetermined distance from the N-pole of the permanent magnet 4 and the second Hall element 6 is located in contact with the N-pole of the permanent magnet 4.

Described below is the fourth example of the present invention. In this example, the temperature characteristics of the displacement sensor is further improved by arbitrarily adjusting the temperature coefficient of the permanent magnet and the Hall elements.

Figure 10:
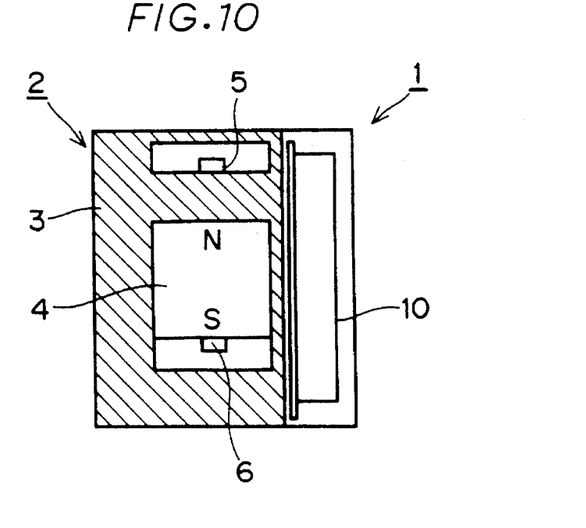
FIG. 10 is a longitudinal sectional view of the sensing element of the displacement sensor in accordance with the fourth example of the present invention.

As shown in FIG. 10, the displacement sensor 1 of this example comprises a sensing element 2 which consists of a permanent magnet 4, a first Hall element 5, and a second Hall element 6, all of which are contained in a case 3. A circuit means 10 is attached to a side of the case 3. The structure of the circuit means 10 is identical to that of FIG. 6.

Figure 23:
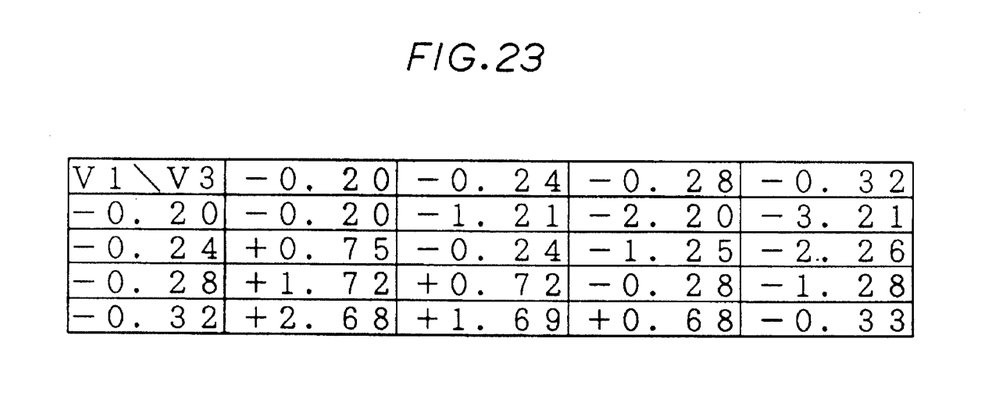
FIG. 23 is a table showing the relationship between the output V0 and the outputs V1 and V2 when the displacement is 10 mm.

In this example, the temperature coefficient of the permanent magnet 4 and the first and second Hall elements 5 and 6 is adjusted so that the coefficient of the displacement sensor as a whole approaches zero. For instance, when the temperature coefficient of the permanent magnet 4 and the first Hall element 5 is equal to that of the permanent magnet 4 and the second Hall element 6, the temperature coefficient of the displacement sensor is negative. However, it is possible to minimize the temperature coefficient of the displacement sensor to zero by making the Hall element 5 and 6 have temperature coefficient different from each other with the permanent magnet 4 used in common. FIG. 23 shows the relationship between V1, V3, and V0, where the displacement is 10 mm. The temperature coefficient of the Hall elements 5 and 6 are arbitrarily adjusted by selecting a combination of the outputs of V1 and V3 so that the output V0 becomes zero, taking into account the relationship between the output V0 and the outputs V1 and V3.

In this example, elements each having a temperature coefficient that is varied by the magnetic flux density, for example, InAs elements, are used as the first and second Hall elements 5 and 6. The temperature coefficients of the Hall elements 5 and 6 are arbitrarily adjusted so that they differ from each other.

Figure 11:
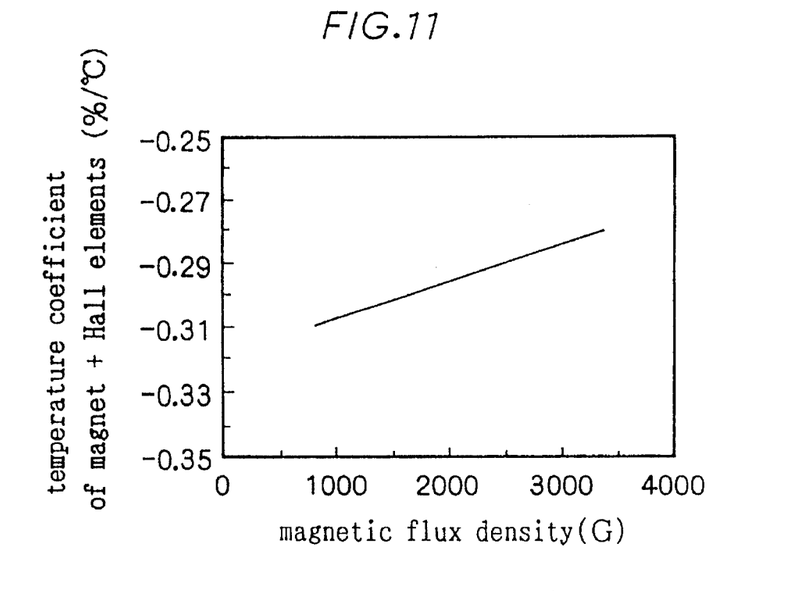
FIG. 11 is a graphical representation of the characteristics of the total temperature coefficient of the magnet and the Hall elements in relation to the magnetic flux density.

With the InAs Hall elements, the temperature coefficient (%/°C.) of the permanent magnet 4 plus the Hall elements is varied depending on the magnetic flux density (G) of the permanent magnet 4, as shown in FIG. 11.

Figure 12:
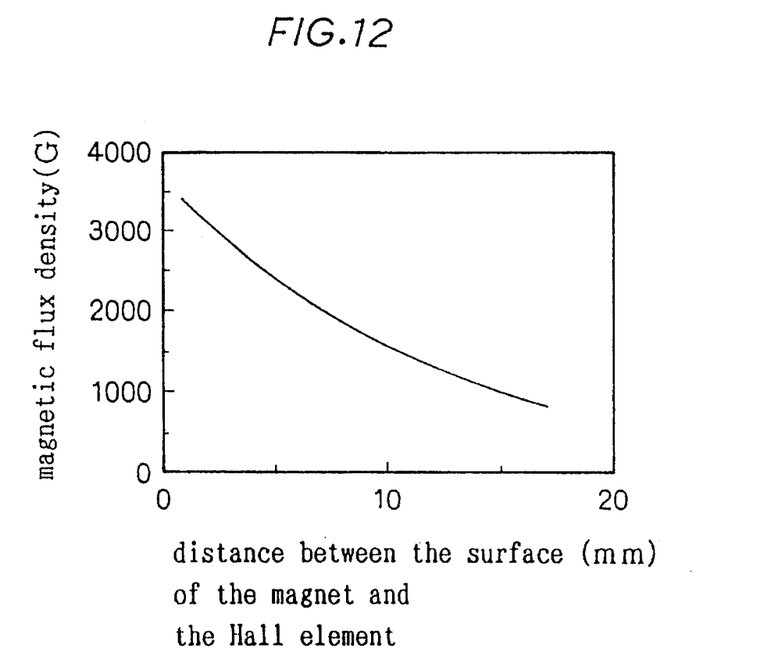
FIG. 12 is a graphical representation of the relationship between the magnetic flux density and the distance from the magnet to the Hall elements.

In this example, with a wire 7 having a diameter of 28 mm used as the material to be measured, the relationship between the magnetic flux density (G) and the distance (mm) from the surface of the magnet to the Hall element can be shown in FIG. 12. When the distance between the upper end of the permanent magnet 4 and the first Hall element is 7 mm and the distance between the first Hall element 5 and the outer surface of the wire 7 is 5 mm, the temperature coefficient of the permanent magnet 4 and the first Hall element 5 becomes −0.29%/°C. while the temperature coefficient of the permanent magnet 4 and the second Hall element 6 becomes −0.28%/°C. and the displacement is 0 mm, the output V1 of the amplifier 11 is 2.73 V. The output V1 of the amplifier 11 can be determined by the formula:

$$V1 = 2.73 \times 10^{-3} \times B1 \times (1 - 2.9 \times 10^{-3} \times (T-20)) \times f(X)$$

When the temperature is T1 and the displacement is 0 mm, the output V3 of the amplifier 13 which is adjusted by the attenuator 14 is 2.73 V, which is equal to the output V1 of the amplifier 11 for adjusting the output V0 of the bias cancelling circuit 17 to 0 V. Since the magnetic flux density at the second Hall element 6 is not varied by the displacement of the wire 7, the output V3(V) of the amplifier 13 can be determined by the formula:

$$V3 = -2.73 \times (1 - 2.8 \times 10^{-3} \times (T-20))$$

Figure 24:
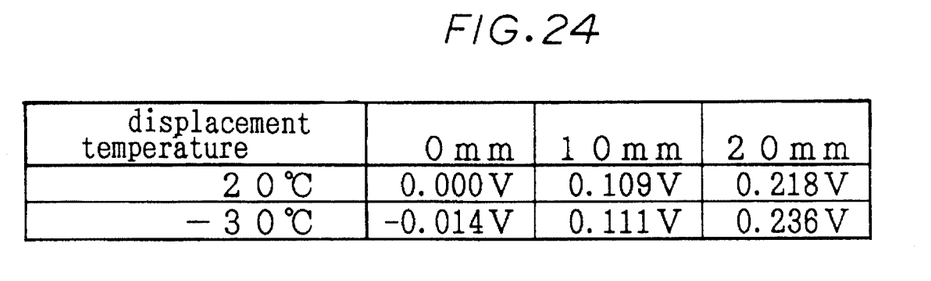
FIG. 24 is a table showing the circuit output V0 generated when the temperature is 20° C. or −30° C. and the displacement is 0 mm, 10, or 20 mm.

FIG. 24 shows the output V0 when the displacement and temperature are subjected to variations. The temperature coefficient of the whole displacment sensor is −0.04%/°C. when the displacement is 10 mm, and the temperature coefficient is −0.17%/°C. when the displacement is 20 mm.

In this example, the output variation by the 50° C. temperature variation is very small even when the displacement is 20 mm, thus enabling accurate sensing of the displacement.

Figure 13:
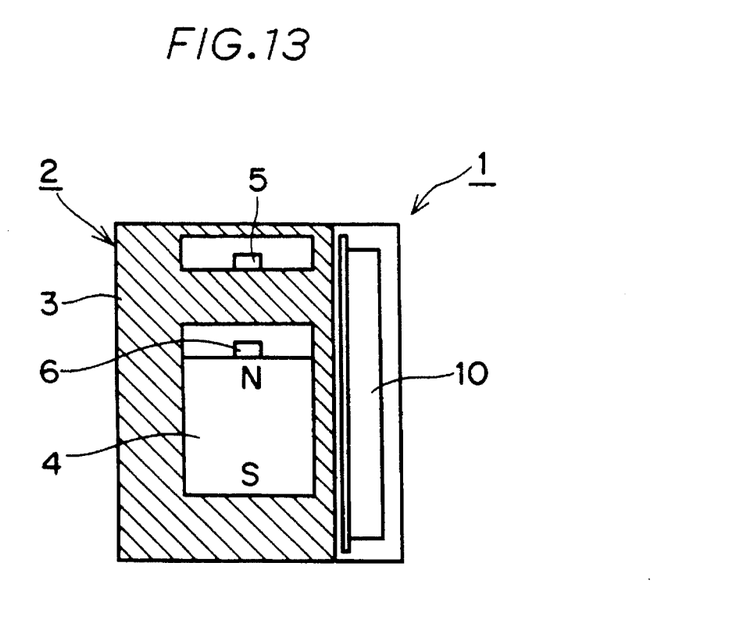
FIG. 13 is a longitudinal sectional view of yet another embodiment of the sensing element.

Although the second Hall element 6 is disposed in contact with the S-pole of the permanent magnet 4 in this example, the second Hall element 6 may be in contact with the N-pole of the permanent magnet 4 as shown in FIG. 13.

Next, the fifth example of the present invention will be described. Just as in the fourth example described before, the temperature characteristics of the displacement sensor is minimized by adjusting the temperature coefficient of the permanent magnet and the Hall elements. Two Hall elements having different temperature coefficients from each other are used as the first and second Hall elements. The sensing element 2 and the circuit means 10 are formed in the same manner as in the fourth example.

In this example, the two Hall elements having different temperature coefficients from each other are used as the first and second Hall elements 5 and 6. The Hall elements 5 and 6 are arbitrarily employed so that the temperature coefficient of the displacement sensor 1 approaches zero. The temperature coefficient of each of the Hall elements 5 and 6 is determined depending on which driving method is suitable for each Hall element.

Figure 14:
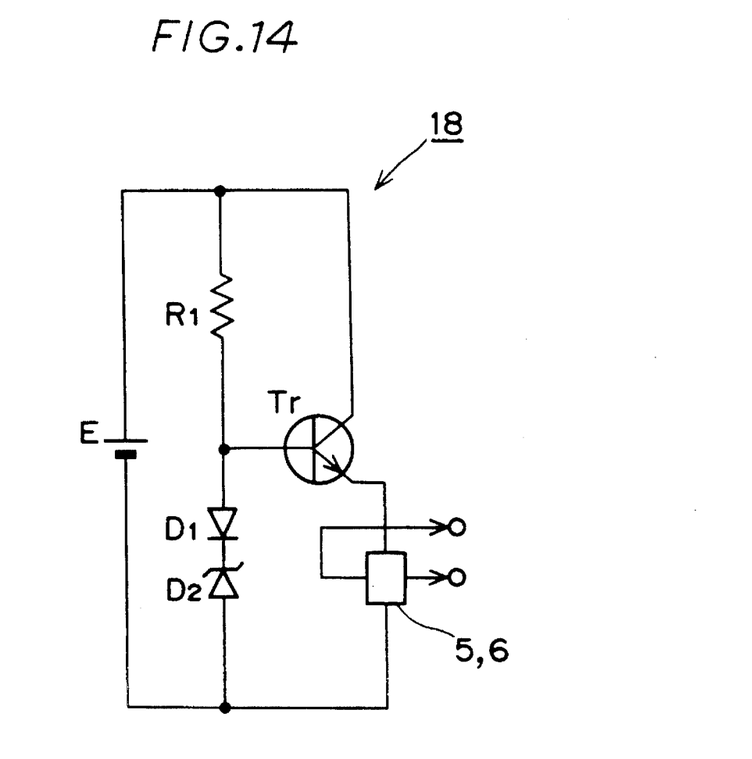
FIG. 14 is a diagrammatic view of an example of the constant-voltage driving circuit for the Hall elements disposed in the displacement sensor in accordance with the fifth example of the present invention.
Figure 15:
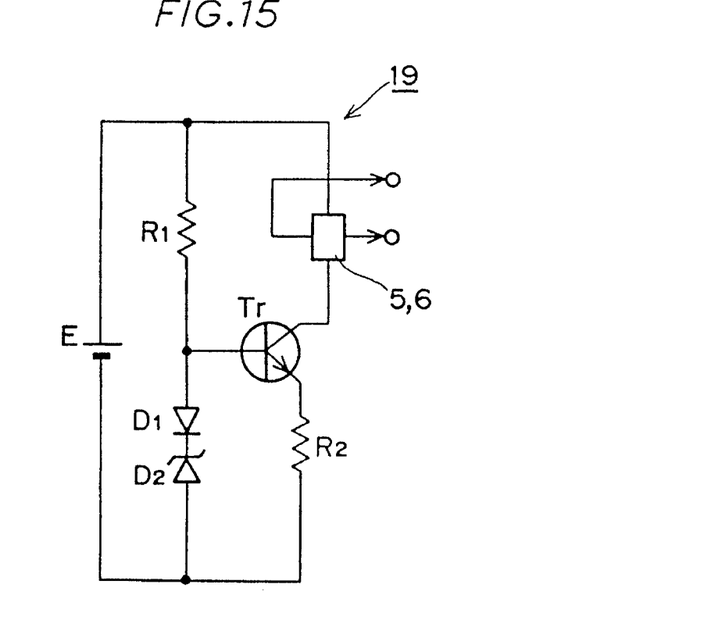
FIG. 15 is a diagrammatic view of an example of the constant-current driving circuit for the Hall elements disposed in the displacement sensor.

As for the driving method for the Hall elements 5 and 6, FIG. 14 illustrates a constant-voltage driving circuit 18 and FIG. 15 shows a constant-current driving circuit 19. In the drawings, Tr indicates a transistor, E indicates a DC power source, R1 indicates a partial pressure resistor, D1 and D2 indicate bias diodes, R2 indicates an emitter resistor, and 5 and 6 indicate Hall elements.

Figure 25:
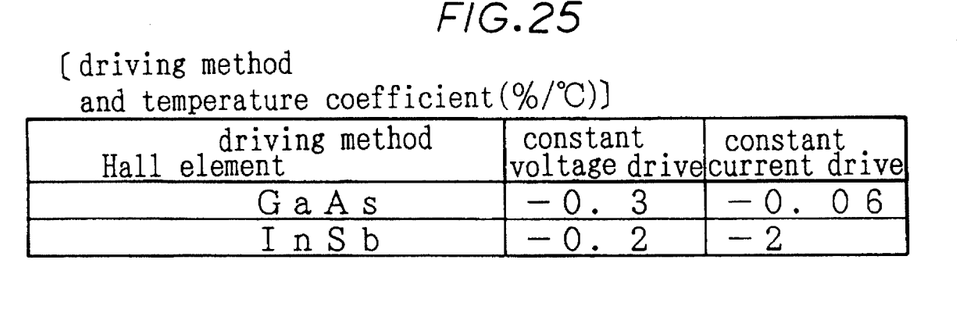
FIG. 25 is a table showing the relationship between driving method and temperature coefficient.

As the Hall elements 5 and 6, a GaAs element and an InSb element are employed. Each Hall element is combined with the driving circuit 18 or 19 so that the temperature coefficient can be arbitrarily determined as shown in FIG. 25.

Thus, by using two different Hall elements and combining them with a driving circuit, the temperature coefficient of the displacement sensor can be minimized close to zero.

The sixth example of the present invention will be described below. In this example, the temperature of the displacement sensor 1 itself is kept constant so as to be independent of the temperature of the external environment.

Figure 16:
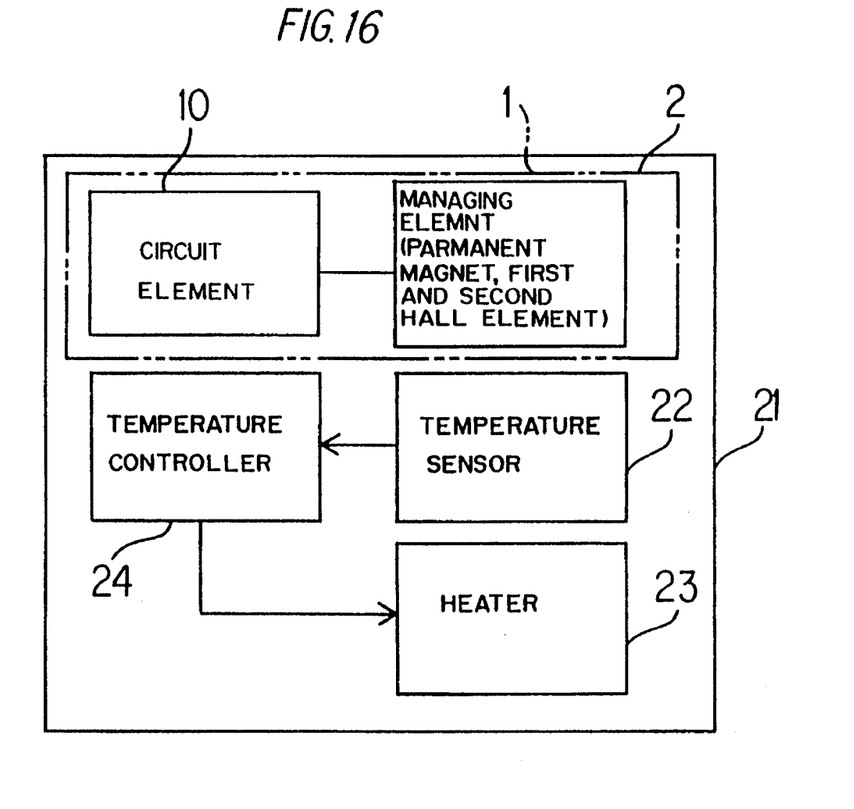
FIG. 16 is a schematic view of the structure of the displacement sensor in accordance with the sixth example of the present invention.

As shown in FIG. 16, contained in a case 21 are a sensing element 2 (consisting of a permanent magnet 4, first and second Hall elements 5 and 6) of the displacement sensor 1, a circuit means 10, a temperature sensor 22 for sensing the temperature of the inside of the case 21, a heater 23 for heating the inside of the case 21, and a temperature controller 24 for controlling the temperature of the inside of the case 21 by driving the heater 23 so as to obtain a predetermind temperature.

Since the permanent magnet 4 and the first and second Hall elements 5 and 6 are constantly maintained at a predetermined temperature, the permanent magnet 4 and the first and second Hall elements 5 and 6 are not adversely affected by the temperature variations of the external enviornment, whereby highly reliable sensing of the displacement can be performed using the circuit of the first example shown in FIG. 6.

Figure 26:
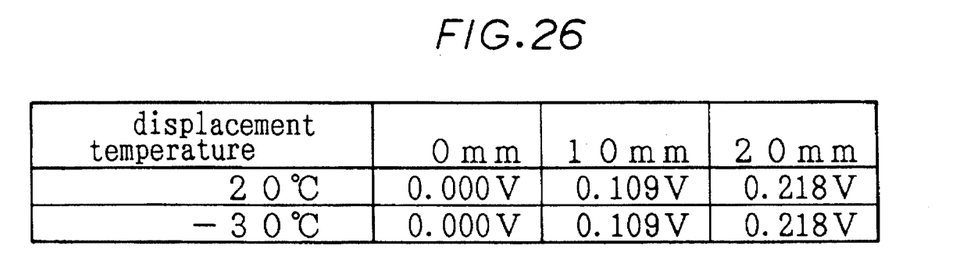
FIG. 26 is a table showing the circuit output V0 generated when the temperature is 20° C. or −30° C. and the displacement is 0 mm, 10, or 20 mm.

The inventors of the present invention have conducted some experiments on the output V0 and the results are shown in FIG. 26. The temperature coefficient of the displacement sensor 1 is 0%/°C. (the displacement is 10 mm).

The seventh example of the present invention will be described. This example is aimed at improving the response of the output. Since the permanent magnet 4 and the first and second Hall elements 5 and 6 are all contained in the case 3 as shown in FIGS. 1, 6, 10, and 13 of the foregoing examples, the thermal conductivity depends on the material used for the case 3 and the temperature of the external environment.

Figure 17:
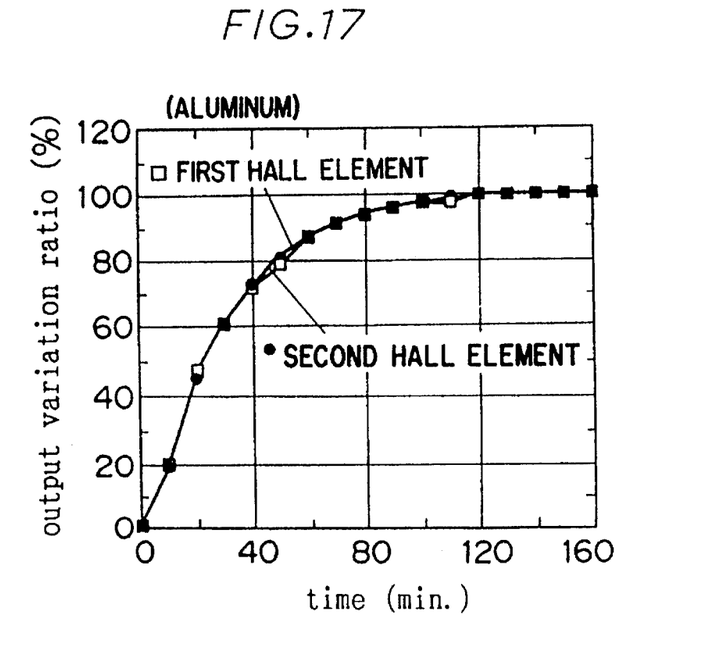
FIG. 17 is a graphical view of the output variation ratios of the Hall elements with the lapse of time, wherein the case of the sensing element of the displacement sensor is made of aluminum in accordance with the seventh example of the present invention.
Figure 18:
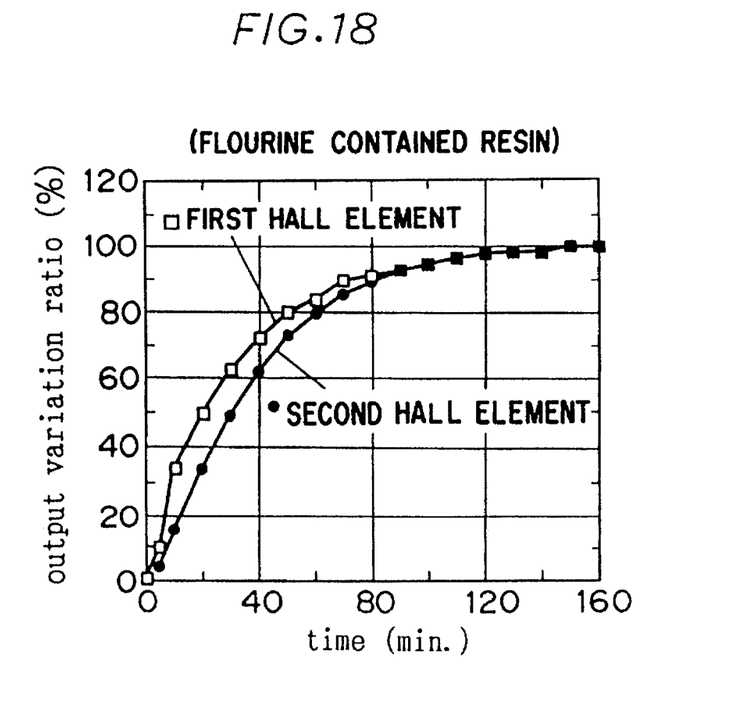
FIG. 18 is a graphical view of the output variation ratios of the Hall elements with the lapse of time, wherein the case of the sensing element of the displacement sensor is made of fluorine contained resin.

In this example, the case 3 is made of a material having a high thermal conductivity k (k>10 (W·m$^{-1}$·k$^{-1}$), such as aluminum. FIG. 17 shows the characteristics of the variation ratios of the outputs V1 and V2 of the permanent magnet 4 and the first and second Hall elements 5 and 6 when the case 3 is made of aluminum. FIG. 18 shows the characteristics of the variation ratios of the outputs V1 and V2 when the case 3 is made of fluorine contained resin which has a low thermal conductivity.

As can be seen from both drawings, in the case of aluminum, there is little difference in output response caused by variations in position, because of the rapid response to the variation ratios of the outputs V1 and V2. On the other hand, in the case of fluorine contained resin, there is a significant difference in output response, due to the slow response to the variation ratios of the outputs V1 and V2.

Figure 19:
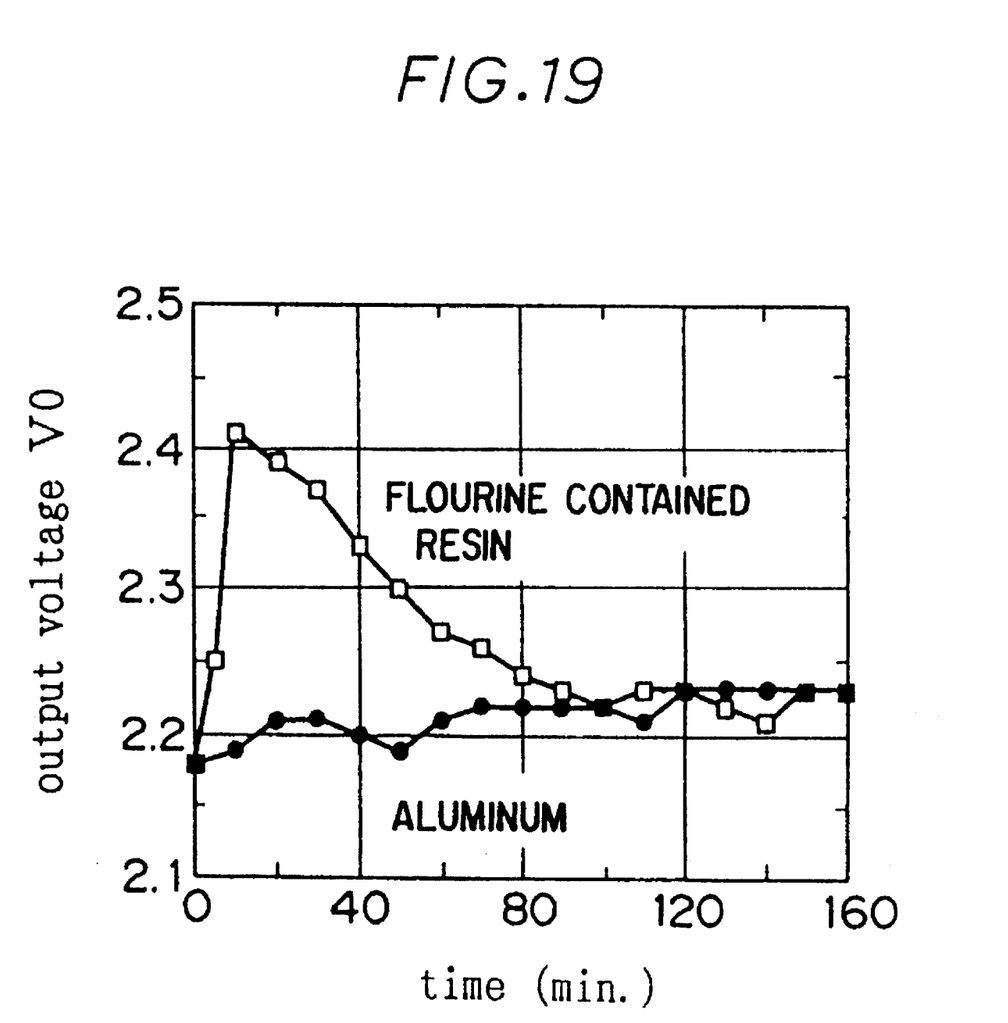
FIG. 19 is a graphical view of the output variation ratios of the displacement sensor with the lapse of time in both cases where the case of the sensing element of the displacement sensor is made of aluminum and where the case is made of fluorine contained resin.

FIG. 19 shows the characteristics of the output V0 of the displacement sensor with the lapse of time in both cases where the case 3 is made of aluminum and where the case 3 is made of fluorine contained resin. When fluorine contained resin is used, the response is slowed in both Hall elements 5 and 6. With the case 3 made of aluminum in accordance with this example, the response is hardly slowed.

Thus, by forming a case of a material having a high thermal conductivity in accordance with this example, it is possible to obtain a sensor which hardly causes a lag in the response due to the temperature variations of the Hall elements.

Although the examples of the present invention have been described in the preferred form with the use of the permanent magnet 4, one more permanent magnet of the same type can be used and the outputs of the first and second magnetoelectric conversion means are generated by the respective permanent magnets. In such case, electromagnets can also be used in place of permanent magnets.

INDUSTRIAL FIELD OF THE INVENTION

With the simple structure in which a magnet and magnetoelectric conversion means which are generally used are employed, the displacement of a magnetic material to be measured can be accurately sensed over a wide temperature range. A displacement sensor of such structure can be used outdoors or even in a place where the temperature is low and varies in a wide range, for example, in highlands or in a harshly cold place. The displacement of a magnetic material such as a wire can be accurately sensed by the displacement sensor of the present invention even in a harsh environment as descrived above. Therefore, the displacement sensor of the present invention is desirable when high precision sensing is needed.

We claim:

1. A displacement sensor for sensing displacement of a magnetic material to be measured, comprising:

first magnetoelectric conversion means located in a place where a magnetic flux density is varied by displacement of said magnetic material to be measured, second magnetoelectric conversion means of the same type as that of said first magnetoelectric conversion means located in a place where a magnetic flux density is not varied by the displacement of said magnetic material to be measured, and circuit means connected to said first and second magnetoelectric conversion means for adding outputs of said two magnetoelectric conversion means at a ratio of $V20/V10$ to provide a result of $V2-[V1\times(V20/V10)]$, wherein $V1$ and $V2$ are outputs from said first and second magnetoelectric conversion means, respectively, and $V10$ and $V20$ are outputs from said first and second magnetoelectric conversion means, respectively, for a displacement of 0 at a reference temperature.

2. A displacement sensor according to claim 1, wherein said reference temperature is 20° C.

3. A displacement sensor according to claim 1, wherein said first and second magnetoelectric conversion means, and said circuit means are all contained in a nonmagnetic case.

4. A displacement sensor according to claim 3, wherein said case has a heat insulating structure so that the temperature in said case is kept constant.

5. A displacement sensor according to claim 3, wherein said case is made of a material having a high thermal conductivity.

6. A displacement sensor for sensing displacement of a magnetic material to be measured, comprising:

first magnetoelectric conversion means located in a place where a magnetic flux density is varied by displacement of said magnetic material to be measured, second magnetoelectric conversion means of the same type as that of said first magnetoelectric conversion means located in a place where a magnetic flux density is not varied by the displacement of said magnetic material to be measured, first circuit means provided in said first and second magnetoelectric conversion means and having a temperature coefficient of a polarity opposite to that of said magnet and said magnetoelectric conversion means so as to compensate for caused by temperature variations, and second circuit means connected to said first and second magnetoelectric conversion means for adding the outputs of said two magnetoelectric conversion means at a ratio of $V20/V10$ to provide a result of $V2-[V1\times(V20/V10)]$, wherein $V1$ and $V2$ are outputs from said first and second magnetoelectric conversion means, respectively, and $V10$ and $V20$ are outputs from said first and second magnetoelectric conversion means, respectively, for a displacement of 0 at a reference temperature.

7. A displacement sensor according to claim 1 or 6, wherein said magnetoelectric conversion means are Hall elements or magnetic resistance elements.

8. A displacement sensor according to claim 6, wherein said reference temperature is 20° C.

9. A displacement sensor for sensing displacement of a magnetic material to be measured, comprising:

first magnetoelectric conversion means located in a place where a magnetic flux density is varied by displacement of said magnetic material to be measured, second magnetoelectric conversion means of the same type as that of said first magnetoelectric conversion means located in a place where a magnetic flux density is not varied by the displacement of said magnetic material to be measured, circuit means connected to said first and second magnetoelectric conversion means for adding the outputs of said two magnetoelectric conversion means at a ratio of $V20/V10$ to provide a result of $V2-[V1\times(V20/V10)]$, wherein $V1$ and $V2$ are outputs from said first and second magnetoelectric conversion means, respectively, and $V10$ and $V20$ are outputs from said first and second magnetoelectric conversion means, respectively, for a displacement of 0 at a reference temperature, and means for adjusting a temperature coefficient of said first magnetoelectric conversion means so as to differ from a temperature coefficient of said second magnetoelectric conversion means thereby providing accurate displacement reading in a wide range of temperature variations.

10. A displacement sensor according to claim 9, wherein said reference temperature is 20° C.

11. A displacement sensor according to claim 9, wherein said first and second magnetoelectric conversion means are composed of elements each having a temperature coefficient which varies depending on the magnetic flux density.

12. A displacement sensor according to claim 9, wherein said first and second magnetoelectric conversion means are InAs elements.

13. A displacement sensor according to claim 9, wherein temperature coefficients are adjusted by combining the driving methods used for said first and second magnetoelectric conversion means.

* * * * *